March 12, 1940.  P. F. YUNGLING  2,193,753
STEERING MECHANISM FOR MOTOR VEHICLES
Filed Aug. 23, 1937
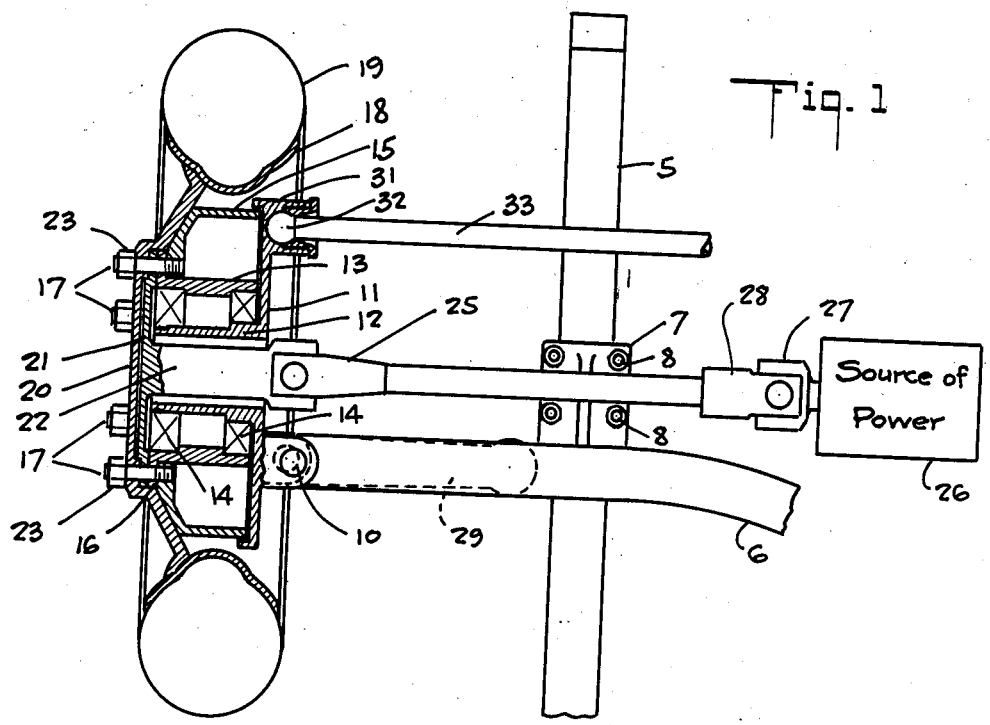
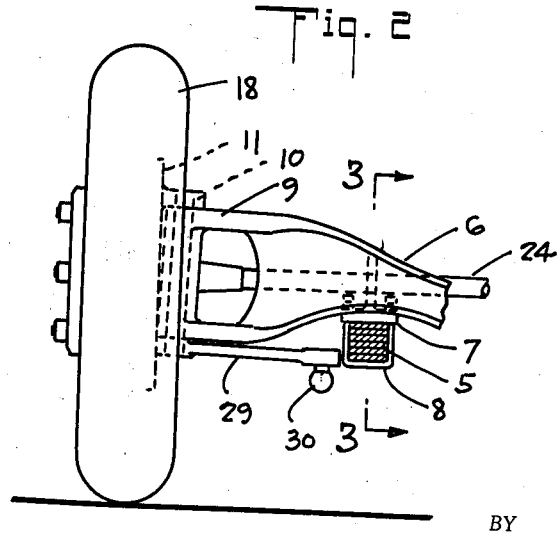
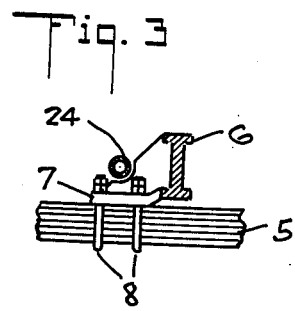
INVENTOR.
PAUL F. YUNGLING
BY Joseph F. Westall
ATTORNEY.

Patented Mar. 12, 1940

2,193,753

UNITED STATES PATENT OFFICE 2,193,753

STEERING MECHANISM FOR MOTOR VEHICLES

Paul F. Yungling, Los Angeles, Calif.

Application August 23, 1937, Serial No. 160,445

5 Claims. (Cl. 180—43)

This invention relates to steering mechanism for motor vehicles, and particularly contemplates the combination of a structure embodying the eccentric disposition of the steering knuckle on the steered wheels of a vehicle with drive means therefor. The present application is a continuation-in-part of my co-pending application, Serial Number 154,350, filed July 19, 1937.

The application of a steering knuckle to front vehicle wheels in offset relation to the wheel spindle as provided for in my said co-pending application, permits the wheel to be turned with respect to the rear wheels and longitudinal axis of the car by transferring the usual pivoting of the front wheels on the roadway to one of the rear wheels, depending on the direction of the turn to be negotiated, and results in numerous advantages incident to parking and turning the vehicle by allowing an increase in the permissible range of angular movement of the wheels with respect to the axis of the car. The device of this invention embodies structure capable of this operation, and accordingly, all objects of my said co-pending application are inherent in the apparatus here disclosed.

The direction of drive of a vehicle having power communicated solely through the rear wheels will always be in parallel alignment with the longitudinal axis of the car. Consequently, the turn of the front wheels results in a strain upon them, the severity of which is determined by the degree of their angle with the direction of drive.

It is a specific object of the present invention to obviate the aforesaid difficulty by the provision of steering mechanism for the wheels of a vehicle permitting a wide range of their angular movement with respect to the longitudinal axis of the car, in combination with connecting means from a power source to apply drive to the wheels in a direction to which they are turned, and thereby not only eliminate strain on the wheels, incident to the conventional application thereto of drive at an angle to the plane through their periphery, but, also, avoid the dissipation of energy by such misdirection of power.

Another object is to provide a power connection for the front wheels of a vehicle of the character above indicated, which may be utilized in connection with usual rear wheel drive as an auxiliary unit operable to pull the vehicle in the direction of the turn only upon angular movement of the steered wheels.

Another object is a more simple application of a conventional front wheel drive to a vehicle by the provision of separate points of connection to the front wheels for the drive shaft and axle, respectively.

Other objects and salient features of my invention will be apparent to those of skill in the art upon an examination of the following description read in the light of the accompanying drawing, in which:

Fig. 1 is a plan view partly in section of my invention as applied to the front wheels of an automobile;

Fig. 2 is an elevation of the front wheel unit illustrated in Fig. 1;

Fig. 3 is an enlarged sectional view taken on lines 3—3 of Fig. 2.

Referring to the drawing in detail, the numerals of which indicate similar parts throughout the several views, 5 designates generally a conventional leaf spring supported by an axle 6. The axle is integrally formed with a laterally extending bracket 7. Spring clips 8 extend through bracket 7 and under the spring 5 in any manner well known in the art to rigidly mount the axle and spring. The ends of axle 6 are bifurcated at 9 for the support of a vertical king pin 10. A circular wheel mounting disc 11 is eccentrically journalled on king pin 10, preferably rearward of and in horizontal alignment with the axis of the mounting disc 11. The lateral disposition of the point of attachment of the axle to the spring by means of bracket 7 minimizes strain on the spring resulting from torsional stress imposed on the axle as a result of its off-center connection to the wheel mounting.

Integrally formed with the mounting disc 11 is a hub comprising the stationary bearing cone 12. A wheel cone 13 encircles cone 12, being rotatable on bearings 14 carried by cone 12.

An annular brake drum 15 is mounted on cone 13 and is secured rigidly to a radial flange 16 on the outer end of cone 13 by means of bolts 17, later referred to, and incloses brake structure of any type well known in the art, which, not forming a part of the present invention, is not shown in the drawing or further alluded to. 18 indicates a wheel carried by the axle 6 having mounted thereon a conventional pneumatic tire 19. The center or hub of the wheel comprises a solid circular plate 20 disposed parallel to the plane through the periphery of the wheel. The plate is mounted on bolts 17 which extend through holes in the plate equi-spaced from each other and the peripheral edge thereof. Also mounted on bolts 17 between plate 20 and flange 16 is a radial flange 21 of a wheel drive spindle 22. Nuts 23 threaded on the outer ends of bolts 17 removably clamp the plate hub 20 of the wheel to the rotatable spindle and cone flanges, 21 and 13, respectively, and to the brake drum 15. The wheel spindle 22 extends concentrically from its integral connection with flange 21 through the hub bearing cone 12. The spindle is connected to a drive shaft 24 by a conventional universal joint 25. The opposite end of drive shaft 24 is operatively communicated to a source of power 26 through a second universal joint 27 and a slip joint 28.

A steering arm 29 is secured to the wheel mounting disc 11 adjacent each steering knuckle of respective front wheels and terminates in the usual ball connection 30 for a socket of steering control mechanism (not shown). A ball socket 31 is integrally formed on disc 11 of each wheel, preferably adjacent its foremost edge for the swivel attachment of a ball 32 formed on each opposite end of a tie rod 33, whereby the wheels will be maintanied in parallel alignment throughout their movement in response to actuation by the steering control mechanism.

It will be apparent that as the wheels are turned on king pin 10 of the steering knuckle, the distances between the center of the respective wheels and the source of power will be proportionately lengthened and shortened, which will be compensated by the slip joint 28 in an obvious manner.

While I have shown but one embodiment and but a single application of my invention, it should be understood that numerous changes may be made in size, proportion, number, or shape of the various parts; that the axle may be connected to the wheel mounting of each wheel at a point in vertical alignment with the wheel spindle to minimize torsional strain on the axle and associated parts; that the axle may be supported below the spring, if desirable; and that other conventional forms of springs most adaptable to the disposition of the axle with respect to the wheels may be utilized,—all without departing from the spirit of my invention as defined by the appended claims.

What I claim and desire to secure by Letters Patent is:

1. In a device of the character described, a wheel mounting disc having secured thereto a bearing cone, bearings carried by said cone, a rotatable cone carried by said bearings, a drive spindle secured to said rotatable cone, an axle pivoted to said mounting disc at a point thereon offset from a vertical plane parallel to said axle through the center of said disc, and means to rotate said drive spindle.

2. In a device of the character described, a wheel, a drive spindle secured to said wheel, a source of power, a drive shaft, means comprising a universal joint and a slip joint to connect said source of power to said drive shaft, a universal joint connecting said drive shaft with said spindle, a wheel mounting, bearings for the support of said wheel on said wheel mounting, a king pin journalled to said wheel mounting at a point thereon in offset relation with respect to a vertical plane through the axis of said spindle, and an axle mounted on said king pin.

3. In a device of the character described, a wheel mounting disc, a wheel secured to said mounting disc, an axle, means to connect said axle pivotally with said wheel mounting disc in offset relationship to the axis of said wheel, a spindle connected to said wheel, a source of power, and means to connect said source of power to said spindle throughout the range of movement of said wheel mounting disc on its point of pivot to said axle.

4. In a device of the character described, a wheel mounting disc, a spindle concentrically extending through said disc, and rotatable with respect thereto, a wheel secured to said spindle, means to rotate said spindle, an axle pivoted eccentrically to said disc, a tie rod swivelled eccentrically to said disc diametrically opposite to the point of pivot of said axle.

5. In a device of the character described, a wheel mounting disc carrying a stationary cone, bearings on said cone, a rotatable cone encircling said stationary cone on said bearings, a spindle, means to secure said rotatable cone to said spindle, a source of power, a drive shaft, a universal joint connecting said drive shaft to said spindle, a slip joint connecting said drive shaft to said source of power, an axle, a vertical pin pivoted to said axle and to said disc offset from said spindle, and a tie rod swivelled to said disc at a point thereon diametrically opposite to the point of pivot of said pin.

PAUL F. YUNGLING.